(12) United States Patent
Hoffman et al.

(10) Patent No.: US 7,698,258 B2
(45) Date of Patent: Apr. 13, 2010

(54) SEARCHABLE STORAGE SYSTEM

(75) Inventors: William R Hoffman, Berkeley, CA (US); Marcus J. Jager, Boulder Creek, CA (US); John P. MacCormick, San Francisco, CA (US); Kristof Roomp, Seattle, WA (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 178 days.

(21) Appl. No.: 11/445,960

(22) Filed: Jun. 2, 2006

(65) Prior Publication Data

US 2007/0282806 A1 Dec. 6, 2007

(51) Int. Cl.
*G06F 7/00* (2006.01)

(52) U.S. Cl. .......................................................... 707/3
(58) Field of Classification Search ...................... 707/3
See application file for complete search history.

(56) References Cited

U.S. PATENT DOCUMENTS

| | | | |
|---|---|---|---|
| 5,600,596 A * | 2/1997 | Shirakihara | 365/189.16 |
| 5,878,220 A * | 3/1999 | Olkin et al. | 709/217 |
| 5,992,737 A * | 11/1999 | Kubota | 235/380 |
| 6,029,164 A | 2/2000 | Birrell et al. | 707/3 |
| 6,067,543 A | 5/2000 | Burrows | 707/4 |
| 6,119,123 A | 9/2000 | Elenbaas et al. | 707/102 |
| 6,170,063 B1 | 1/2001 | Golding | 713/502 |
| 6,574,377 B1 * | 6/2003 | Cahill et al. | 382/305 |
| 6,615,219 B1 * | 9/2003 | Bruso et al. | 707/102 |
| 6,718,321 B2 | 4/2004 | Birrell et al. | 707/3 |
| 6,741,983 B1 * | 5/2004 | Birdwell et al. | 707/5 |
| 6,763,347 B1 * | 7/2004 | Zhang | 707/2 |
| 2002/0178341 A1 * | 11/2002 | Frank | 711/216 |
| 2003/0206717 A1 | 11/2003 | Yogeshwar et al. | 386/69 |
| 2004/0199530 A1 * | 10/2004 | Avadhanam et al. | 707/100 |
| 2005/0193084 A1 * | 9/2005 | Todd et al. | 709/214 |
| 2005/0198076 A1 * | 9/2005 | Stata et al. | 707/200 |
| 2005/0198166 A1 | 9/2005 | Kawaji | 709/206 |
| 2006/0015339 A1 | 1/2006 | Charlesworth et al. | 704/251 |

(Continued)

FOREIGN PATENT DOCUMENTS

CA 2 240 556 12/1998

(Continued)

OTHER PUBLICATIONS

Freeman, E. et al., "Lifestreams: A Storage Model for Personal Data", *SIGMOD Record*, Mar. 1996, 25(1), 80-86.

(Continued)

*Primary Examiner*—John R. Cottingham
*Assistant Examiner*—Mohammed R Uddin
(74) *Attorney, Agent, or Firm*—Woodcock Washburn LLP

(57) ABSTRACT

A searchable storage system indexes data, such as a blob (binary large object) as it is stored. The indexes are stored simultaneously with the data by the same storage mechanism. Data cannot be stored without indexing it. Any indexing technique may be used. The indexes are then used to access the data. This ensures that any inconsistencies can handled at the local level, and are not visible to clients of the system. Data can be put in to, or taken out from, the searchable storage system. Additionally, a query on the data in the searchable storage system may be performed.

16 Claims, 7 Drawing Sheets

U.S. PATENT DOCUMENTS

| | | | |
|---|---|---|---|
| 2006/0047692 A1* | 3/2006 | Rosenblum et al. | 707/102 |
| 2006/0053105 A1 | 3/2006 | Sanchez | 707/4 |
| 2006/0101285 A1* | 5/2006 | Chen et al. | 713/193 |
| 2006/0248038 A1* | 11/2006 | Kaplan et al. | 707/1 |
| 2007/0168336 A1* | 7/2007 | Ransil et al. | 707/3 |
| 2007/0179941 A1* | 8/2007 | Huang et al. | 707/4 |
| 2007/0233972 A1* | 10/2007 | Keithley et al. | 711/154 |

FOREIGN PATENT DOCUMENTS

WO   WO 2004/023328 A1   3/2004

OTHER PUBLICATIONS

"DB2 Content Manager onDemand for z/OS", http://www-306.ibm.com/software/data/ondemand/390/features_advanced.html, Mar. 21, 2006, 3 pages.

"Network Storage Services", Reference Information Storage System Service, http://h20219.www2.hp.com/services/cache/66373-0-0-225-121.aspx, Mar. 21, 2006, 3 pages.

"Hitachi Data Systems", Service Providers Partners-Hitachi Data Systems, http://www.microsoft.com/serviceproviders/partners/hitachi.mspx, Mar. 21, 2006, 3 pages.

* cited by examiner

SEARCHABLE STORAGE SYSTEM

TECHNICAL FIELD

The present disclosure relates generally to the field of computing and, more particularly, to a system and method for storing data.

BACKGROUND

In conventional data storage systems, data is stored opaquely in an un-typed fashion. The storage system does not understand the data formats being stored. The storage system stores the data using keys generated and tracked in an external system. When additional functionality, such as full text searching and/or indexing, is required, these are layered on top using other mechanisms. This causes consistency problems. It is difficult to make sure that all the data in the storage system is properly tracked and indexed and that all the information in the index is up-to-date and does not refer to non-existent data.

SUMMARY

A searchable storage system indexes data, such as a blob (binary large object), as it is stored. The indexes are stored simultaneously with the data by the same storage mechanism. Data is not stored without indexing it. Any indexing technique may be used. The indexes may then be used to subsequently access the data. This ensures that any inconsistencies can handled at the local level, and are not visible to clients of the system.

Data can be put in to, or taken out from, the searchable storage system. Additionally, a query on the data in the searchable storage system may be performed. Other functions may be performed as well, such as deleting data from storage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
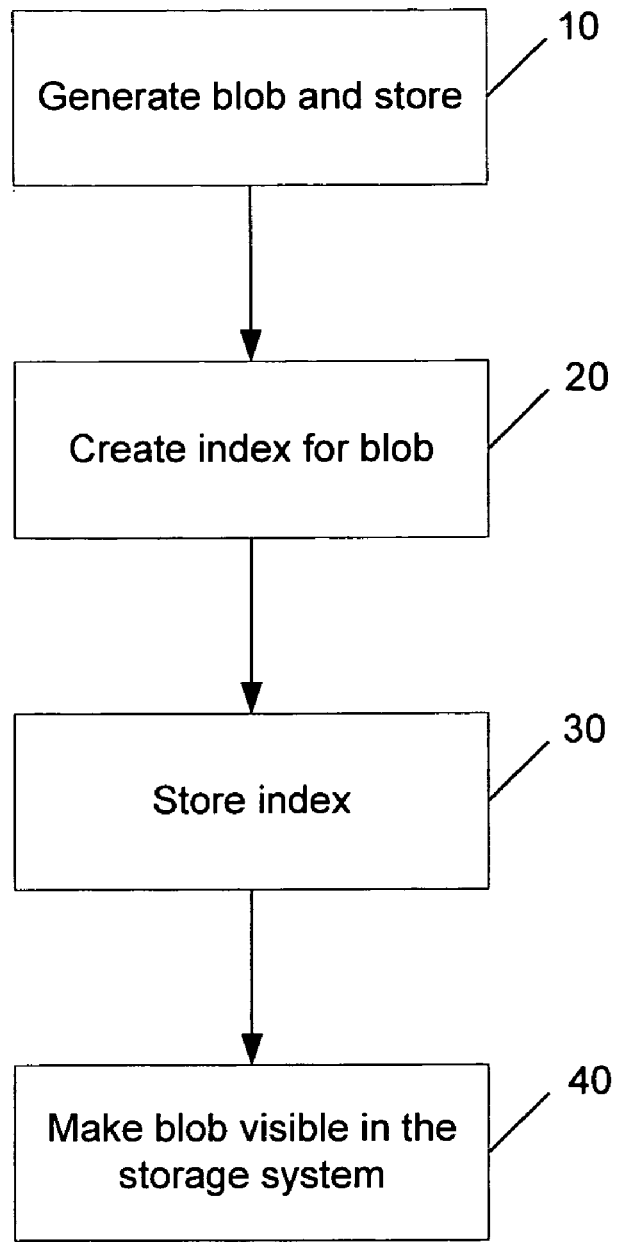
FIG. 1 is a high level flow diagram of an example simultaneous data and index generation method.

Data, such as blob (binary large object) data, is stored un-typed and is fully consistently simultaneously indexed. Realtime indexing is provided, and data is not stored without indexing it. FIG. 1 is a high level flow diagram of an example method. At step 10, a blob is generated and stored in a storage system. As the blob is generated, an index is created at step 20. Any indexing technique may be used. The index is stored at step 30. The blob is not visible in the storage system until the index is created. Thus, at step 40, the blob is made visible in the storage system. The blob may then be retrieved or provided as the result of a query, for example.

A linkage is desirably provided between full text indexing and the storage system. As described further herein, data retrieval occurs using the index, and no outside indexes or tracking information are used. Although blobs are described herein, it is contemplated that any type of data may be stored and indexed.

Figure 2:
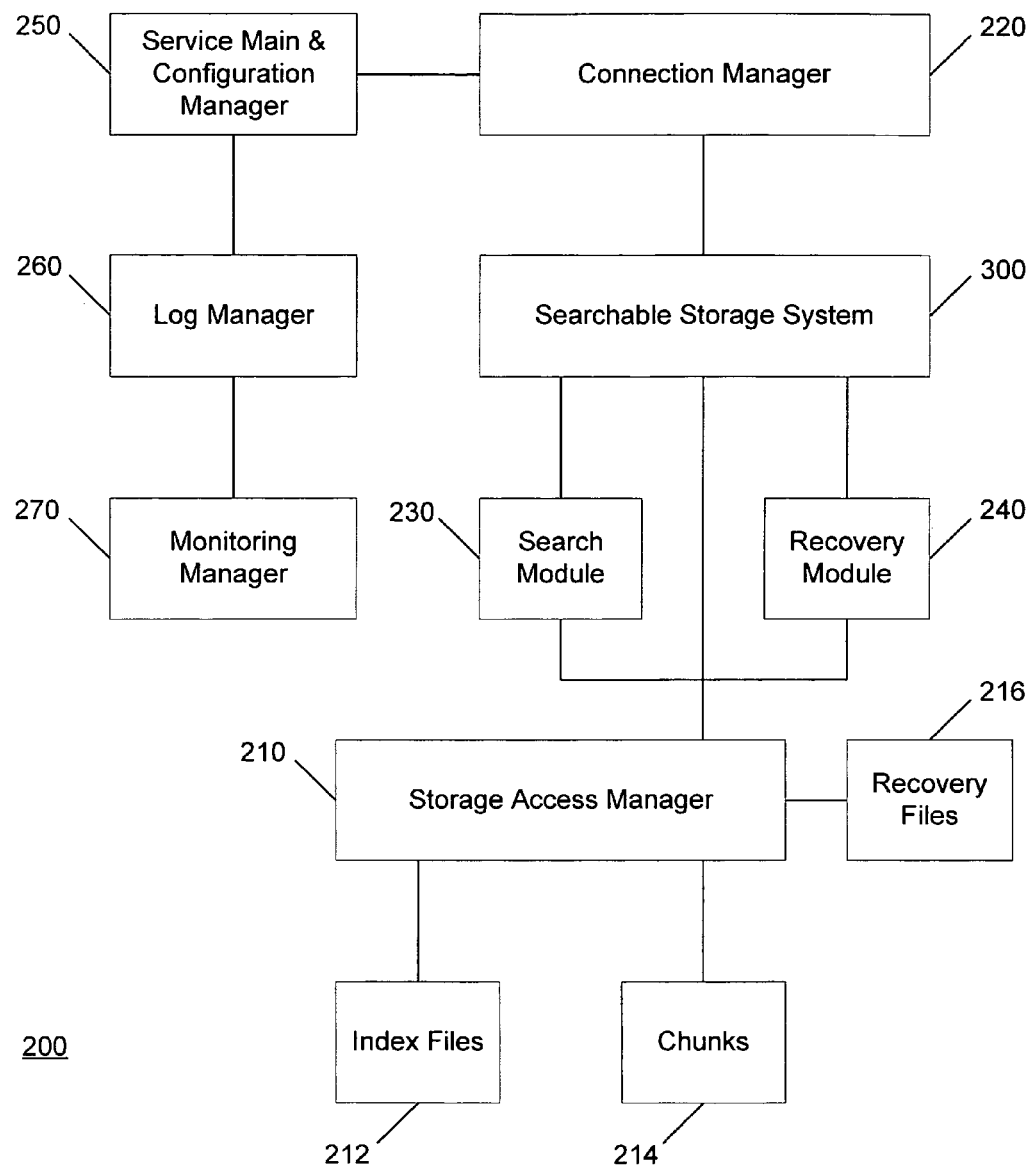
FIG. 2 is a block diagram of an example storage node system.

An example storage node system diagram is shown in FIG. 2. The storage node system 200 comprises a searchable storage system 300 (described further with respect to FIG. 3, for example) and a searching module 230, such as MSN Search for example. The storage node system also comprises a recovery module 240 and a storage access manager 210, which have access to index files 212, chunks 214, and recovery files 216, described further herein. The storage access manager 210 provides a consistent view to the files on the disk (e.g., the index files 212 and chunks 214). In other words, the storage access manager 210 provides some basic transactional guarantees that allow the higher level modules to update the files on the disk without being concerned with partial updates and other failure modes. This may be achieved using the recovery module 240 and the recovery files 216.

A connection manager 220 is provided in the storage node system 200 to connect with a client, for example. A service main and configuration manager 250 may be provided, that uses configuration files. The storage node system 200 may also comprise a log manager 260 which logs events, and a monitoring manager 270 to monitor activities pertaining to the storage node system 200.

An executable, such as DataManager.exe, desirably handles the blob and indexing work on a single storage node in the storage node system 200. In email terms, for example, this means it handles message inserts, reads, and deletes, as well as search index inserts, reads, and compactions.

Blobs may be stored, retrieved, or queried by the searchable storage system 300, using appropriate mechanisms such as APIs for putting, getting, and querying the blobs. Categories of blobs include word processing documents, image files, text files, and spreadsheet files, for example.

More particularly, the fundamental unit of data stored in an example searchable storage system 300 is a blob. A blob comprises a single document, e-mail message, file, or other object which a user typically stores and retrieves as a single unit. The data format of a blob is its file format (e.g., word processing document, AVI movie), and the system 300 allows for various data handlers to appropriately decompress (if necessary) and index specific formats. A document type is a format for which exactly one data handler is specified. Example formats include HTML, plain text, RTF, Word, PowerPoint, Excel, and PDF.

Associated with every blob is some blob metadata, which provides additional information about the blob. The metadata may be flexible and mutable, or immutable. An example metadata schema for each blob comprises a blob identifier, blobId (a GUID), a collection identifier, collectionId (a byte field), an application identifier, applicationId (a byte field), a document type identifier, docTypeId (a byte field), a creation time, creationTime (a uint64 field), an expiration time, expiryTime (a uint64 field), and a size (a uint64, the size in bytes of the uncompressed data in the blob, excluding metadata).

A chunk 214 is a file in storage, e.g., on a disk or memory associated with the searchable storage system 300, that provides efficiency. A chunk may comprise multiple blobs. More particularly, a chunk may refer to a collection of documents and the on-disk data structures required to index and manage those documents. These on-disk data structures include content chunks and index chunks, for example.

A content chunk may be a single file in which many compressed documents are concatenated. The fundamental units that can be appended to and retrieved from content chunks are called documents. Desirably, there is a one-to-one correspondence between documents and blobs, but both terminologies are used herein to distinguish between the fundamental units in a chunk (which are documents) and the fundamental units in the searchable storage system 300 (which are blobs). This distinction is used when applied to IDs: each blob/document has a document ID, DocID (used in reading and writing chunks), which is different from its blob ID (used by the searchable storage system 300 to identify blobs uniquely).

An example DocID may be a 6-byte quantity that identifies the document ordinal number (i.e., whether it is the first, second, third, etc. document in the chunk) and the chunk ID.

Because a document index consists of only two bytes, a content chunk contains a maximum of 65536 documents. Documents may be appended to the chunk one by one until this maximum is reached, but a chunk can be closed earlier if desired. Each document may be stored compressed, but it is not necessary to decompress the whole chunk to read a single document.

An example chunk is full if either of the following conditions hold: (1) it contains the maximum number of documents (e.g., 65536), or (2) the on-disk size of the chunk is greater than or equal to a configuration parameter, e.g., ChunkFullSize. If a chunk is not full, it is unfull. Note that although some documents may have been expunged, this does not affect the fullness of the chunk, since the ordinal numbers of expunged documents cannot be reused.

An example in-memory data structure comprises a chunk state table, a table indexed by chunk ID indicating the state of every chunk that is not closed. This table supports an ordering on the chunks in any one state, so that it makes sense to choose the "first" chunk in a given state, and the "next" chunk and so on. Moreover, this operation desirably is efficient. For example, it is desirable to efficiently select the "first" chunk in the ready-for-append state.

An unfull chunk list may be provided. A current content index is provided that indexes some or all of the documents in a current content chunk. A coverage list is provided and is a list of index files and in-memory indexes whose union is known to cover all content chunks. Note that the coverage list is kept in memory, but it is also recorded in stable storage as part of the recovery file. Any change to the index files in the coverage list must also be recorded in the recovery file.

Chunks also have a maximum on-disk size, equal to a configuration parameter, e.g., ChunkMaxSize. Because any blob must be contained within a content chunk, ChunkMaxSize is also the maximum size of a blob. The size of the blob contains data and blob metadata.

Relevance is a notion intended to capture the usefulness of a blob to a client that has issued a given query, taking into account the content of the client's query and any other pertinent information about the blob and client. Relevance is typically computed from two components: the static rank, which is independent of the query and therefore based on the generic "usefulness" of a blob; and the dynamic rank, which is a function of the query and the blob. The static rank and dynamic rank are combined in some way to compute the total relevance of a blob. Indexes store their DocIDs in order of static rank, so that any query naturally returns hits ordered by static rank. A standard approach is to retrieve a fixed number of hits of maximal static rank, compute the total relevance for each of these hits by incorporating their dynamic rank, sort the hits by total relevance, and return them.

Alternately, the dynamic rank may be disregarded (i.e., the dynamic rank of any blob is defined to be zero), and the static rank of a blob is defined to be the inverse of its creation time in the searchable storage system. Thus, queries return their results in reverse chronological order.

An index chunk is a single file indexing some subset of the data of a single content chunk. An index file is a single file indexing some subset of the data of one or more content chunks. Hence, an index chunk is a particular case of an index file. An index file covers a content chunk if it indexes all the data in that content chunk. A set S of index files covers a content chunk if each piece of data in the content chunk is indexed by some index file in S. Any set S of index files can be merged into a single new index file that indexes the union of the data indexed by the files in S.

An index may be a lexicographically-sorted list of (word, location-list) pairs, where the words are tokens extracted from the blobs by parsing, and a location-list is a list of increasing locations in some abstract location space. Each location appearing in the location-list of a given word W corresponds to one or more occurrences of W in a document. Thus, W's location-list may be mapped to a sequence of documents. This is referred to as the document list for W. The documents in a corpus are assigned a static rank. Indexes may be built so that the document list for any word is ordered by static rank. Therefore, the first document in the document list for a given word has the highest static rank of any document in the list, and so on.

An index stream reader (ISR) is created by inputting a query and an index or set of indexes. The output is a stream of DocIDs (and/or other per-document information that was stored in the index) which satisfy the query. The stream can be read element by element.

A metaword is a type of word inserted into a document by the parser that prepares it for insertion into a content chunk. Desirably, a metaword is distinct from any standard word on which users are permitted to issue queries (e.g., this may be achieved by inserting spaces and/or non-printable characters into metawords). Metawords can be used to implement sophisticated queries on immutable metadata, without having to resort to any techniques other than standard ISRs. For example, there might be two metawords, BlobIdStart and BlobIDEnd. For a blob with ID 345, the parser would insert the following string into the blob: "BlobIdStart 345BlobIdEnd". A query can later be issued for a blob whose ID is 345 by searching for documents in which the word "345" occurs after "BlobIdStart" and before "BlobIdEnd". An example metaword is the EndDoc word. The parser inserts this word at the end of every document, which enables queries to identify different documents in the same index.

ISRs desirably emit matches in the order in which the underlying indexes store their documents. The indexes store their location lists in order of increasing static rank. Therefore, ISRs emit matches in order of increasing static rank. In the case of the searchable storage system, static rank is the inverse of insertion time, so ISRs will emit the most recently-insert documents first.

Figure 3:
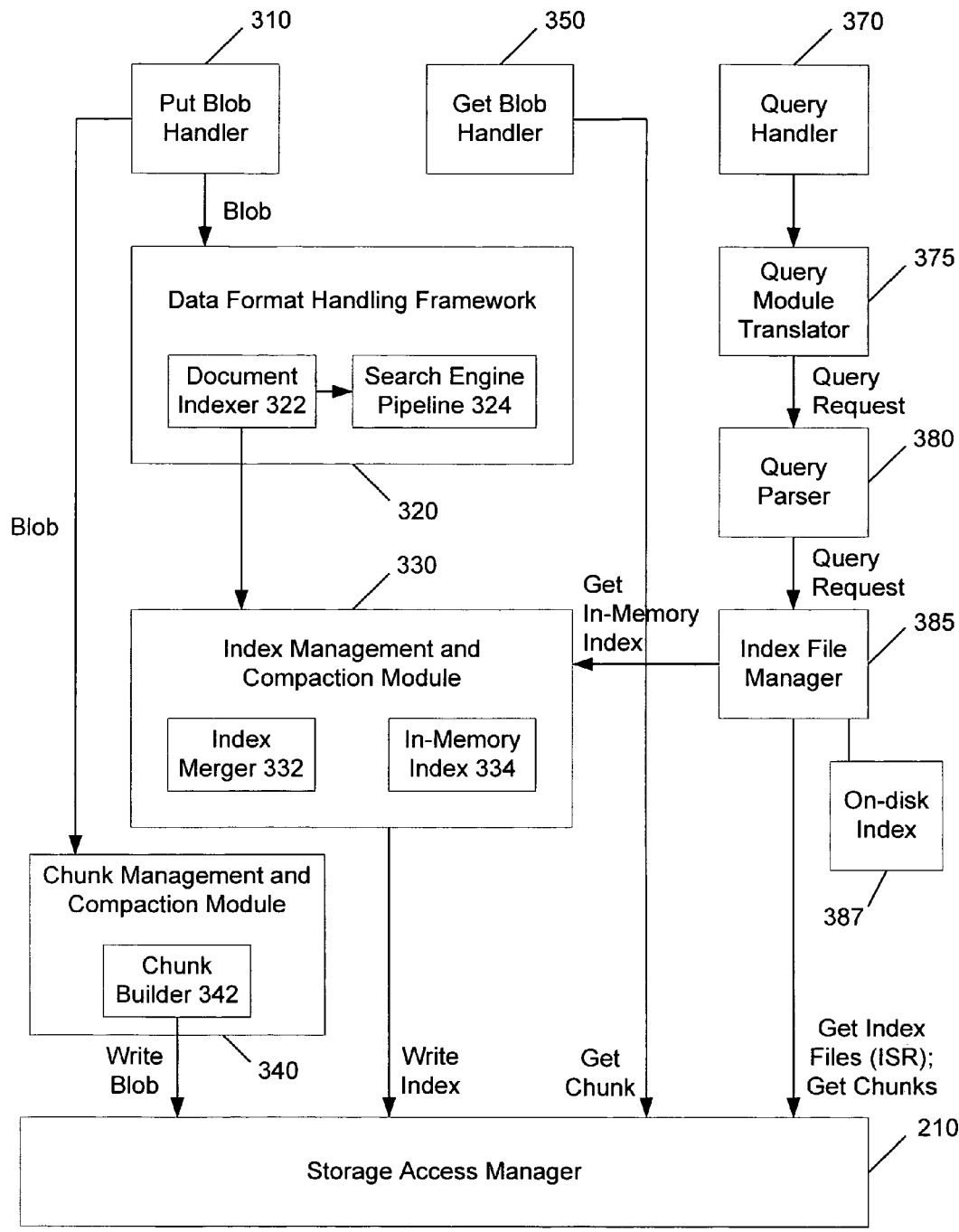
FIG. 3 is a block diagram of an example searchable storage system.

An example searchable storage system diagram is shown in FIG. 3. A blob can be put in (put blob), taken out (get blob), or a query (query blob) may be provided. This is performed by three separate APIs. Other functions may be performed as well, such as deleting a blob from storage, using, e.g., an expire blob that deletes blobs based on time, age, or availability of storage space.

The searchable storage system 300 interacts with a client via the connection manager 220. A put blob handler 310, a get blob handler 350, and a query handler 370 are provided. The put blob handler 310 is in communication with a chunk management and compaction module 340. The chunk management and compaction module 340 comprises a chunk builder 342. The put blob handler 310 provides a blob to the chunk management and compaction module, which processes the blob for data storage by building the appropriate chunk at the chunk builder 342. The chunk management and compaction module 340 provides the blob to the storage access manager 210 for storage. The storage access manager 210 makes sure that the files are updated consistently so that for put blob, the on disk files are updated together in the face of failures, for example. Thus, for write blob and write index, as shown, for example, both happen or neither happens.

The put blob handler 310 is also in communication with a data format handling framework 320 that desirably provides extensibility for various data formats. The data format handling framework 320 comprises a document indexer 322 which recognizes the categories of a blob that can be indexed. A search engine pipeline 324, associated with the search engine 230, is provided, for example, for document classification, conversion to HTML, language detection, HTML parsing, word breaking, etc.

An index management and compaction module 330 (also referred to herein as an index manager) is provided that comprises an index merger 332 and an in-memory index 334. The index is stored in the in-memory index 334. The index management and compaction module 330 provides the index to the storage access manager 210 for storage.

The index manager 330 maintains the in-memory index 334, flushes it out to the disk, and performs index merging using the index merger 332, when appropriate. The index manager 330 desirably creates an in-memory index for each open chunk that it is managing. The index manager 330 is responsible for locating the index files and the in-memory indexes that can satisfy a query. It is also responsible for maintaining the index for blobs that have recently been received and their index has not yet been persisted in the disk. To accomplish the latter, the index manager 330 keeps the in-memory index 334.

The in-memory index 334 desirably provides the most updated version of the index for the current chunk. Queries desirably reflect the content of any completed put blob operation in real time. Each time a document (e.g., a blob) is received and indexed, the in-memory index 334 desirably is made aware of the update. The in-memory index 334 desirably is able to provide its current state to the component that aggregates all the index information in order to execute a query. The index manager 330 desirably is able to flush the in-memory index 334, and desirably is thread safe for read/write index operations.

Compaction and merging may also be performed by the index manager 330. Compaction may be performed after a blob has been expunged, to remove any references to it from the relevant index file, thus reclaiming the storage space consumed by those references. Merging may be performed if the in-memory index size is above a certain threshold, to persist the in-memory index to the disk (e.g., either by creating a new file or by merging it to an existing one).

An example API function, PutBlob, may store a blob and its metadata in the searchable storage system 300, and indexes them for subsequent queries. According to an example, a PutBlob request is issued by a client for example, and is sent to the storage node 200 hosting the collection that is to store the blob. Inputs may include identifiers, such as collection ID, application ID, document type ID, as well as blob contents and blob metadata (i.e., blob ID, collection ID, application ID, expiry time, uncompressed size), for example. Success or an error message, for example, may be provided as output.

Figure 4:
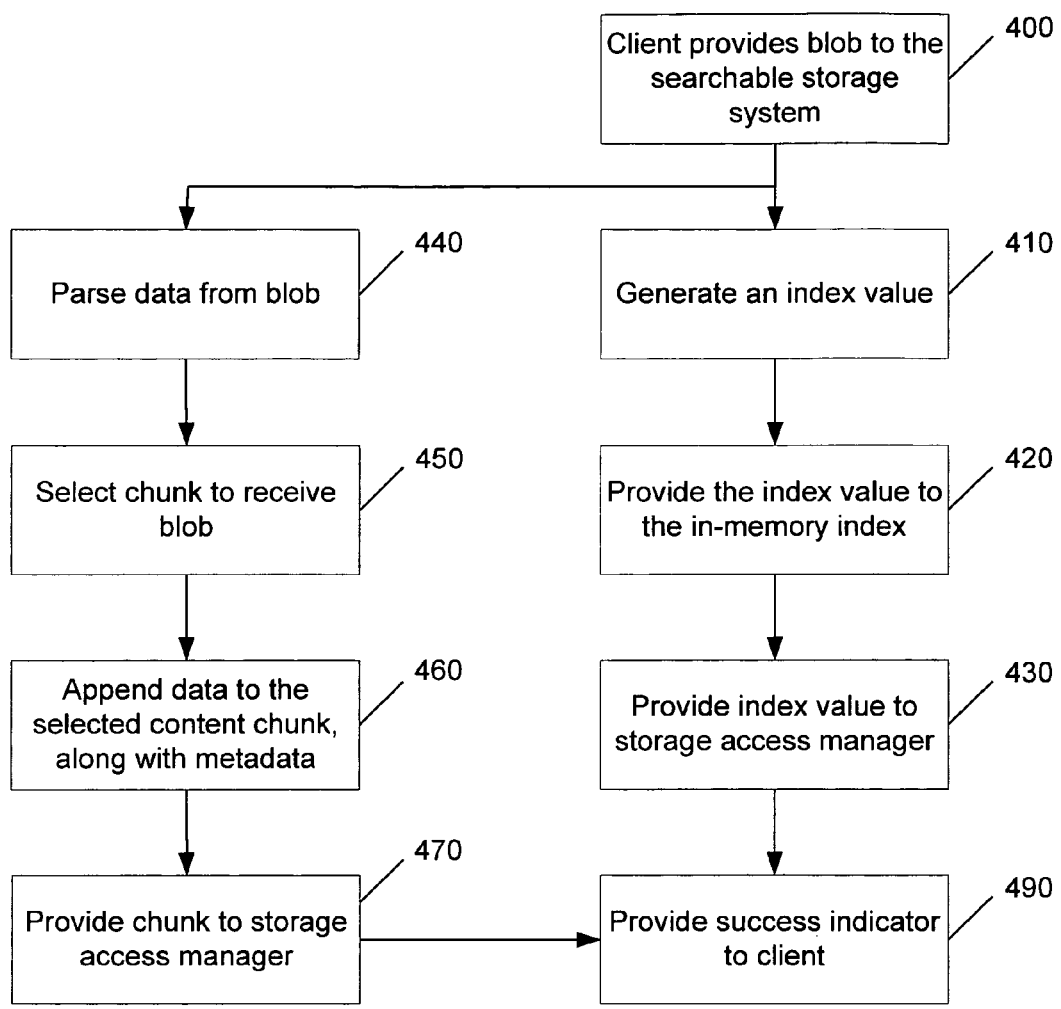
FIG. 4 is a flow diagram of an example method of putting blobs that allows immediate querying.

An example method of putting blobs that allows immediate querying is described with respect to FIG. 4. A client provides a blob to the searchable storage system 300 at step 400. The blob is subsequently parsed to get index terms, such as words and positions. The words may be real words in the document or special metawords for special query types. Any number of parsers and conversions may be used. For example, the blob is parsed at the data format handling framework 320 to generate an index value, at step 410. The index value is provided to the index management and compaction module 330 where it is added to the in-memory index 334, at step 420. The in-memory index 334 may be merged with an on-disk index 387 occasionally. Any indexing technique may be used, such as that used by MSN Search, for example. The index is then provided to the storage access manager 210, at step 430.

The raw bits of data are also parsed from the blob, at step 440, and ultimately are stored on disk via the chunk management and compaction module 340. At step 450, a content chunk is selected by the storage access manager 210 to receive the new blob. It is determined how much storage space will be consumed by the new blob, including metadata and data (e.g., compressed data). A content chunk that is large enough to accept the new blob is selected. If no such content chunk exists, an error message may be provided. The blob contents are then appended to the selected content chunk as a single document, at step 460. The blob metadata is also stored in the content chunk. The chunk is provided to the storage access manager, at step 470. A success indicator may be provided to the client, at step 490.

The get blob handler 350 is in communication with the storage access manager 210 and gets or retrieves the chunks using the storage access manager 210. The get blob handler 350 may use the index file manager 385 to determine the proper DocID for the blob ID. An example API function, GetBlob, allows clients of the searchable storage system 300 to obtain the contents of a given blob and its metadata.

Figure 5:
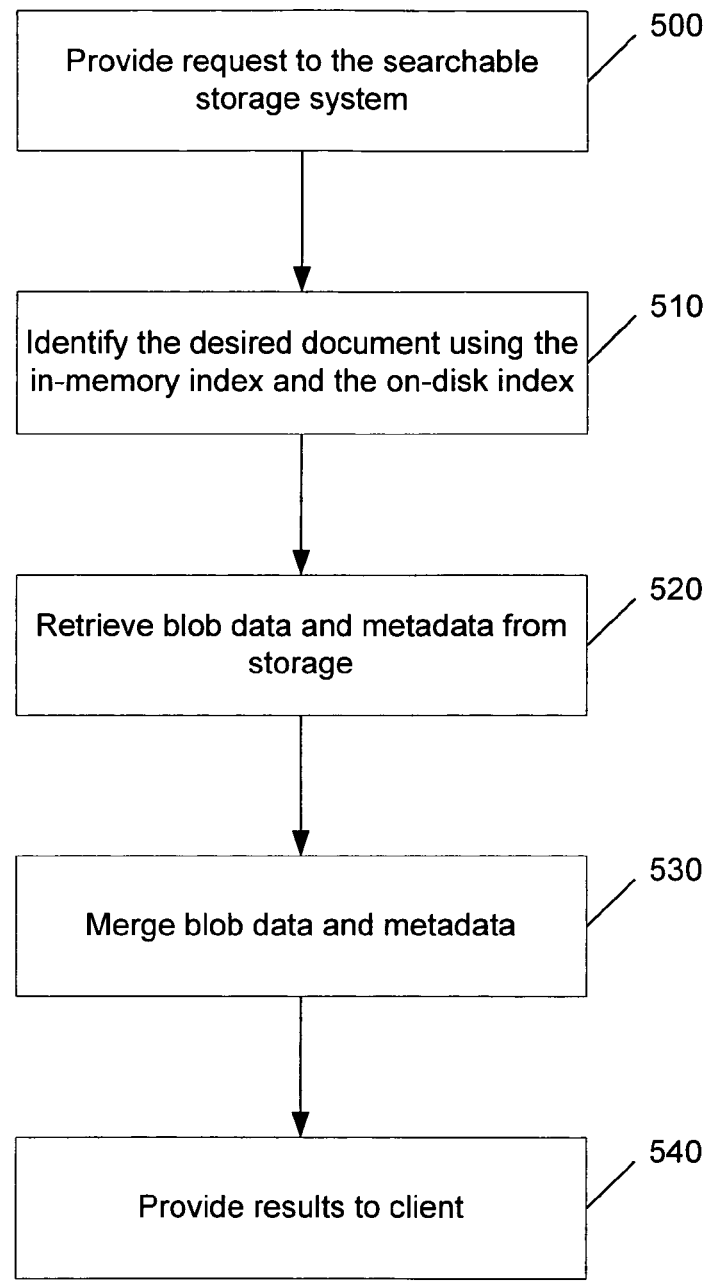
FIG. 5 is a flow diagram of an example method of getting blobs.

An example method of getting blobs is described with respect to FIG. 5. A client provides a request, in the form of a blob ID, to the searchable storage system 300, at step 500. The in-memory index is consulted, along with the on-disk index, at step 510, to get the DocID of the desired blob and other information, identifying a particular document in a particular content chunk. The appropriate blob metadata and data are retrieved from storage, at step 520, and merged at step 530. The results, including the data and metadata, are returned to the client at step 540. Alternately, if the query returns no blobs, a "blob ID does not exist" or a "blob ID is invalid" error message may be returned, for example.

Figure 6:
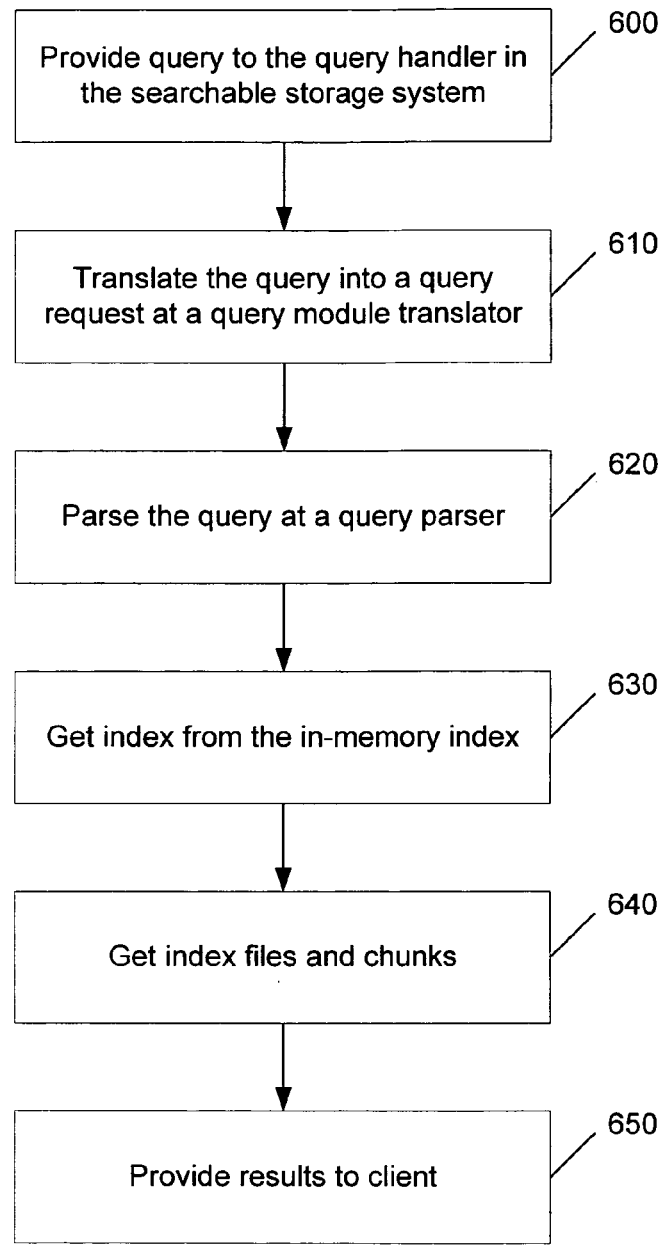
FIG. 6 is a flow diagram of an example method of querying blobs.

Clients, such as users and software services, may obtain a summary of the blobs that satisfy a given query, pursuant to an API function, such as QueryBlobs. To perform a query, the actual query is used, along with the index to probe for the query. An example method of querying blobs is described with respect to FIG. 6. The query handler 370 receives a query, which may be a predicate on blobs at step 600. The query may comprise various constraints on the metadata and data of the target blobs.

The query handler 370 provides the query to a query module translator 375 which generates an appropriate query request, at step 610, and sends it to a query parser 380. The query parser 380 parses the query at step 620, and sends the parsed query request to an index file manager 385. At step 630, the index file manager gets an index from the in-memory index 334. The query parser 380 also sends the query request to the storage access manager 210 to get the index files (ISR) and appropriate chunks that will fulfill the query, at step 640. The query response may then be provided to the client, at step 650.

The result of the query may be a data structure called a blob summary table, which comprises a list of blobs with their metadata. Each individual record in the blob summary table is a blob summary that comprises the blob metadata. The number of matches may be provided as output along with the blob summary table, if desired. An error message or code may also be provided to indicate a failure. Not all matching blobs are necessarily returned in the blob summary table; the number of blobs returned may be bounded. Desirably, the rows in the blob summary table are sorted in descending order of relevance. For example, the order of relevance is the based on the time received.

More particularly, ISRs are created for each of the indexes that must be consulted by the coverage list. An ISR may also be created based on the special EndDoc word. The ISRs are combined into a container ISR. The blob summary table is built one row at a time, until a maximum number of rows is reached or until the container ISR returns no more hits, whichever occurs sooner. The DocID of the current container ISR hit is obtained, and a blob summary is constructed for this DocID. The blob summary comprises obtaining the metadata for the DocID from the content chunk.

Other functions may be provided, such as an API that allows a client to change the contents of an existing blob, and an API used by external clients to set the expiry time of a blob (e.g., to delete a blob from the system).

Exemplary Computing Arrangement

Figure 7:
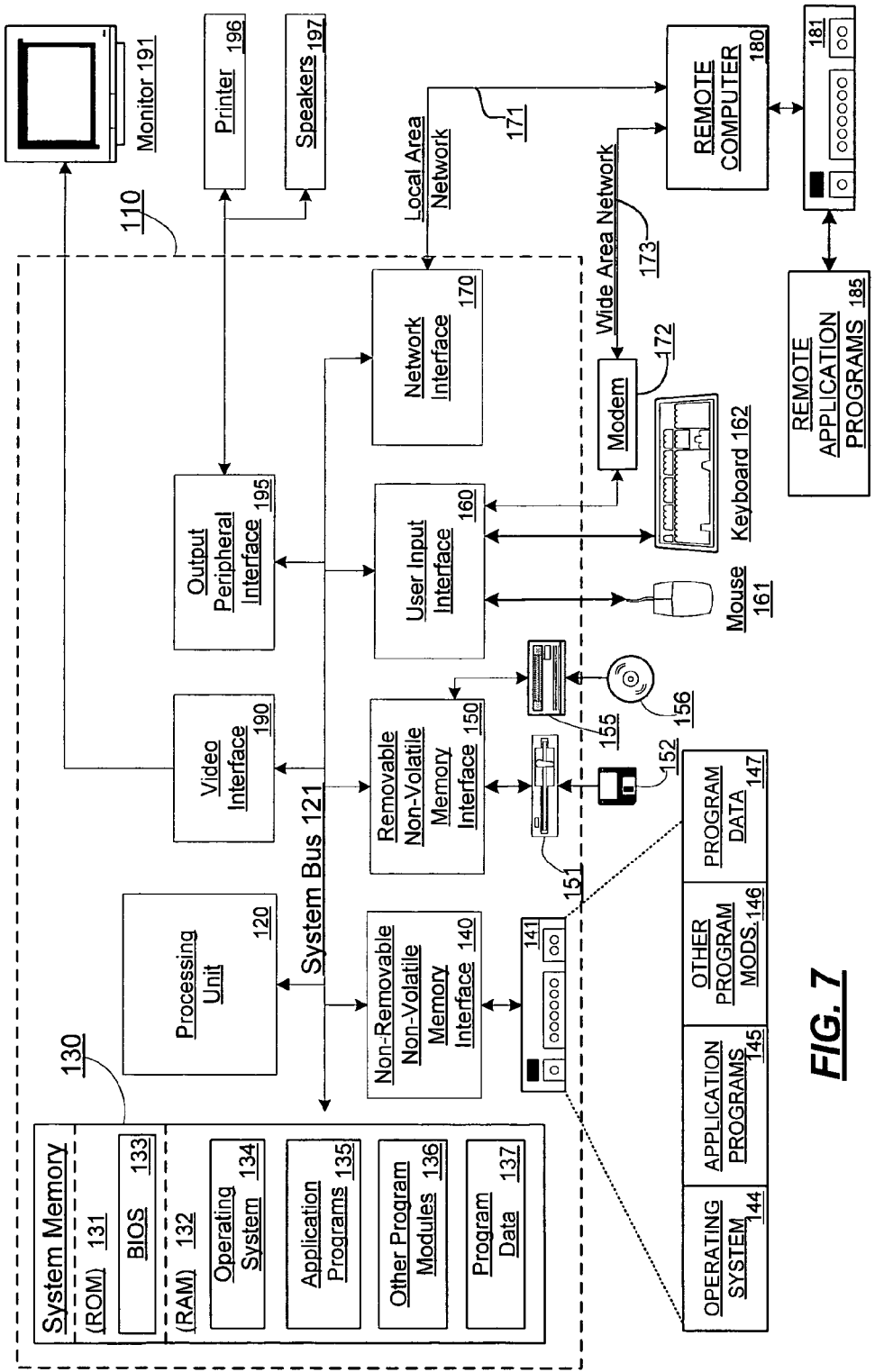
FIG. 7 is a block diagram of an example computing environment in which example embodiments and aspects may be implemented.

FIG. 7 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A data storage and indexing method comprising:
   receiving data comprising one or more binary large objects (blobs), each blob comprising a single document, having a file format, and each blob having associated metadata including a blob identifier, an application identifier, and a document type identifier that identifies a file format of a corresponding blob from among a plurality of different file formats, and a document identifier that identifies a content chunk and a position within the content chunk of a corresponding blob;
   creating an index for the data;
   simultaneously storing the index for the data and the data in a searchable storage system; and
   making the data visible in the searchable storage system;
   retrieving at least a desired portion of the data from the searchable storage system pursuant to a request for the data by receiving one or more blob identifiers corresponding to the desired portion of data, determining the document identifiers corresponding to each blob of the desired portion of the data, and retrieving the portion of the data corresponding to the determined document identifiers.

2. The method of claim 1, wherein storing the data in the searchable storage system comprises:
   determining a content chunk that is large enough to accept the data, wherein the content chunk has a specified maximum size; and
   selecting the content chunk to receive the data, appending the data and associated metadata to the content chunk, and providing the content chunk to a storage access manager, wherein a maximum size of a blob is equal to the maximum size of the content chunk.

3. The method of claim 1, wherein creating the index for the data comprises generating an index value and providing the index value to an in-memory index.

4. The method of claim 1, wherein the searchable storage system comprises an index manager comprising an in-memory index; a chunk manager, and a storage access manager, including the steps of the chunk manager building chunks of data and the storage access manager overseeing storage of chunks of data and indexes.

5. A data storage and indexing method comprising: receiving a request to retrieve data from a searchable storage system, the data comprising one or more binary large objects (blobs) each blob comprising a single document, having a file format, and each blob having associated metadata including a blob identifier, an application identifier, and a document type identifier that identifies a file format of a corresponding blob from among a plurality of different file formats, and a document identifier that identifies a content chunk and a position within the content chunk of a corresponding blob; and
   identifying the requested data using an in-memory index, wherein identifying the requested data includes:

generating an appropriate query request; parsing the query request;
sending the query request to an index file manager that gets an index from the in-memory index, the index responsive to the query request;
sending the query request to a storage access manager to obtain index files and chunks responsive to the query request; and
providing the requested data responsive to the query request;
retrieving at least a desired portion of the identified data and associated metadata from the searchable storage system by receiving one or more blob identifiers corresponding to the desired portion of data, determining the document identifiers corresponding to each blob of the desired portion of the data, and retrieving the portion of the data and the associated metadata corresponding to the determined document identifiers;
merging the data and the associated metadata; and
outputting the merged data and the associated metadata.

6. The method of claim 5, wherein identifying the requested data uses an on-disk index.

7. The method of claim 5, wherein generating the appropriate query request comprises translating the request into the query request.

8. The method of claim 7, further comprising:
getting the index from the in-memory index based on the query request;
getting the index files and the chunks from the searchable storage system based on the index; and
outputting information pertaining to the index files and the chunks.

9. The method of claim 5, wherein the searchable storage system comprises:
the index manager comprising the in-memory index;
a chunk manager that builds chunks of data; and
a storage access manager that oversees storage of the chunks of data and indexes.

10. computer-readable storage medium storing computer instructions thereon that when processed by a computer cause the computer to implement managers comprising:
a common index manager comprising an in-memory index;
a common chunk manager that builds chunks of data, the data comprising one or more binary large objects (blobs) each blob comprising a single document, having a file format, and each blob having associated metadata including a blob identifier, an application identifier, and a document type identifier that identifies a file format of a corresponding blob from among a plurality of different file formats, and a document identifier that identifies a content chunk and a position within the content chunk of the corresponding blob; and
a common storage access manager that oversees storage of chunks of data and indexes, wherein the data and the indexes are stored simultaneously;
wherein the common chunk manager retrieves at least a desired portion of the data pursuant to a request for the data receiving one or more blob identifiers corresponding to the desired portion of data, determining the document identifiers corresponding to each blob of the desired portion of the data, and retrieving the portion of the data corresponding to the determined document identifiers.

11. The medium of claim 10, wherein the chunks of data and indexes are stored together.

12. The medium of claim 10, further comprising computer instructions that when processed by the computer cause the computer to implement a data handling framework comprising a document indexer that receives data and generates an index value for the data, the data handling framework in communication with the common index manager.

13. The medium of claim 12, further comprising computer instructions that when processed by the computer cause the computer to implement a handler that receives data, and provides the data to the data handling framework and the common chunk manager.

14. The medium of claim 10, further comprising computer instructions that when processed by the computer cause the computer to implement a handler that receives a request for data and retrieves the data via the common storage access manager.

15. The medium of claim 10, further comprising computer instructions that when processed by the computer cause the computer to implement a handler that receives a query, and an index file manager that accesses the in-memory index and retrieves index files and chunks of data via the common storage access manager.

16. The medium of claim 15, wherein the common index file manager farther accesses an on-disk index.

* * * * *